United States Patent
Kalju

[15] 3,683,122
[45] Aug. 8, 1972

[54] TELEPHONE RINGING SIGNAL DETECTOR AND LINE ANSWERING MEANS

[72] Inventor: Merl Kalju, Maspeth, N.Y.

[73] Assignee: Electrospace Corporation, Bronx, N.Y.

[22] Filed: Feb. 8, 1971

[21] Appl. No.: 113,171

[52] U.S. Cl. .................... 179/84 R, 179/5 R, 179/6 R
[51] Int. Cl. ........................ H04m 1/26, H04m 11/04
[58] Field of Search ..... 179/81 R, 84 R, 5 R, 5 P, 5 J, 179/2 A, 6 R, 6 AC, 6 D, 6 E, 6 TA

[56] References Cited

UNITED STATES PATENTS

| | | | |
|---|---|---|---|
| 3,469,036 | 9/1969 | Meri | 179/84 R |
| 3,301,958 | 1/1967 | Blakeslee | 179/6 D |
| 3,133,992 | 5/1964 | Dickman | 179/6 R |

*Primary Examiner*—Kathleen H. Claffy
*Assistant Examiner*—William A. Helvestine
*Attorney*—Friedman & Goodman, Esqa.

[57] ABSTRACT

A telephone ringing signal detector associated with a line answering circuit for use with an incoming telephone line. The detector includes at least one neon lamp for conducting ringing signals to activate an element of the answering circuit when the neon lamp is conducting. The answering circuit further includes a switch which is normally open when no ringing signal is on the line. Activation of the element effects the closing of the switch so that a voice connection is made. Preferably, the detector includes two neon lamps for low and high voltage ringing, and a third neon lamp to by-pass signals other than ringing signals.

19 Claims, 5 Drawing Figures

PATENTED AUG 8 1972

3,683,122

SHEET 1 OF 2

KALJU MERI

INVENTOR

By Friedman & Goodman

ATTORNEYS

KALJU MERI
INVENTOR
By Friedman & Goodman
ATTORNEYS

TELEPHONE RINGING SIGNAL DETECTOR AND LINE ANSWERING MEANS

BACKGROUND OF THE INVENTION

This invention relates to telephone circuits, and more particularly relates to ringing signal detectors and line answering means for use in such circuits.

Automatic telephone answering circuits are known. Such circuits are typically designed to act as an automatic secretary by performing any of several recording and playback functions upon receipt of an incoming ringing signal. Although various refinements have been made in such machines so as to offer a sophisticated range of flexibility in use, the typical approach in the art still utilizes the incoming ringing signal as the initiator of the sequence of answering and/or playback operations.

Such utilization of the ringing signal has been convenient, but has presented a problem in the mode of ringing signal detector employed. Heretofore the art has employed a very high impedance relay across the incoming line to detect an incoming ringing signal and thereupon introduce a low impedance load across the line, which load would thereupon hold the incoming call just as lifting the telephone receiver would.

A number of disadvantages inhere in this standard approach of the art. In order to find commercial acceptance, an automatic telephone answering system must meet standards defined by the telephone service companies in regard to the effect of such apparatus upon the telephone circuit and its operation. In general, the ringing signal detector must not excessively load down neither the ringing circuit nor the voice circuit. The criteria for such performance are extremely stringent.

Greater definition of these requirements, and explanation thereof, will be made hereinbelow in connection with the detailed description of one embodiment of the present invention. It shall be pointed out at this point however, that high impedance line bridging relay detectors are in all cases poor solutions to the stringent problem presented by these requirements, and additionally are at best extremely expensive due to the same high requirements. Circuits which meet the requirements are typically unresponsive to low level ringing signals and when made sufficiently sensitive thereto, are rendered responsive to signals to which they should not respond.

Moreover, such relay detectors are inherently not highly sensitive to incoming ringing signals. The highest sensitivities attainable with commercially available relays are acceptable under favorable telephone conditions, but are often inadequate under adverse line conditions, and yet are extremely expensive. Maintainance of relays thus upgraded in sensitivity is of course a considerable problem, since they tend to be somewhat unrugged.

Finally, a definite problem inheres in the tendency of such relays to trigger falsely in response to transients on the line, for example when the line is being pulsed by dialling of the local instrument. It is particularly desirable that the ringing signal detection circuits be unresponsive to revert dialling signals impressed on telephone company lines when local subscribers, having answering service circuits associated with their hand set, dial the central office for connection to a remote subscriber so that the detector is not falsely triggered.

In general the art has found bridging relays to be disadvantageous ringing signal detectors for use in automatic telephone answering systems. This has resulted both from the expense inherent in attempting to adapt such a device to telephone standards for loading across the line, and from the relative unreliability of such devices in a system that must have a high degree of overall reliability for commercial acceptance. Despite these advantages, and despite the importance of the problem, the art has heretofore failed to find a more acceptable ringing signal detector circuit judged by the aforesaid requirements.

SUMMARY OF THE INVENTION

To overcome the problems set forth in the prior art, the present invention sets forth a telephone ringing signal detector and line answering means for use with an incoming telephone line. The detector includes means for conducting ringing signals to activate an element of the answering means, the answering means further including switch means which are normally open when no ringing signal is on the line, whereby activation of the element effects the closing of the switch means so that a voice connection is made. The detector means includes at least one neon lamp for voltage ringing, wherein three neon lamps are preferable, one lamp for low voltage ringing, another lamp for high voltage ringing, and the third lamp to by-pass signals other than ringing signals.

According, it is a principal object of the present invention to provide a telephone ringing signal and line answering circuit that overcomes the disadvantages of the prior art.

Another object of the present invention is to provide a high impedance ringing signal detection circuit to initiate the coupling of telephone answering circuits into telephone company lines.

Yet another object of the present invention is to provide a telephone ringing signal and line answering circuit that imposes no load upon the ringing and voice circuits of telephone lines and equipment.

A further object of the invention is to provide an extremely sensitive ringing signal detector circuit that nevertheless cannot be falsely triggered by transient pulses, such as those resulting from local dialling.

A still further object of the invention is to provide a ruggedly constructed, low cost circuit which detects ringing signals and will not be falsely triggered by revert dialling pulses.

An added object of the invention is to provide a circuit that combines all the above-mentioned features with extreme economy and reliability.

BRIEF DESCRIPTION OF THE DRAWINGS

Having in mind the above and other objects that will be evident from an understanding of this disclosure, the invention comprises the devices, combinations and arrangements of parts as illustrated in the presently preferred embodiment of the invention which is hereinafter set forth in such detail as to enable those skilled in the art readily to understand the function, operation, construction and advantages of it, when read in conjunction with a accompanying drawings in which.

DESCRIPTION OF THE PREFERRED EMBODIMENT

Figure 1:
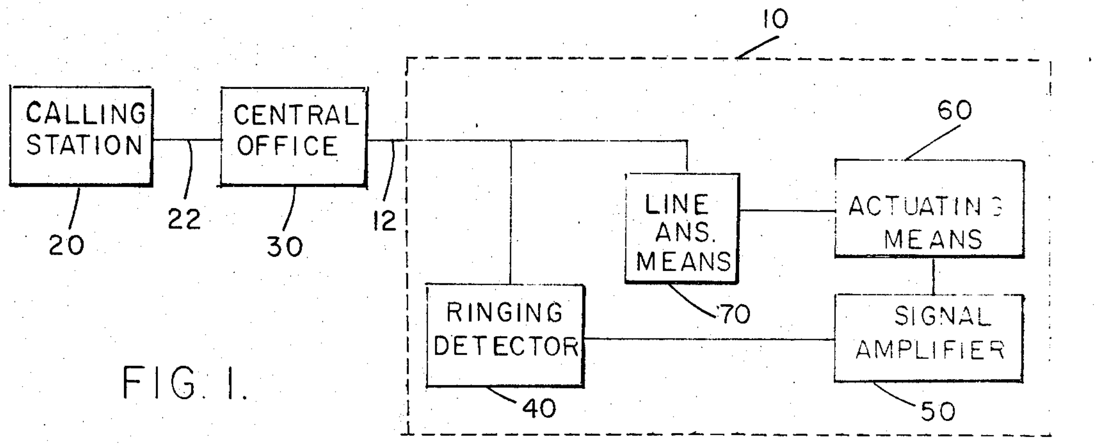
FIG. 1 is a block diagram of a complete telephone system employing the ringing detector and line answering circuit of the present invention.

In order that the invention be disclosed in a clear and concise manner, the disclosure has been simplified to some extent by omitting the talking portion from the illustration of the preferred embodiment and disclosing only the ringing signal detection and line answering means portion of the circuit at the subscriber's station. Although the invention is applicable to multistation signaling systems generally and is not limited to telephone use alone, it is understood that those skilled in the telephone art may readily add speech transmitting and receiving apparatus, and ringing signal apparatus to the circuits illustrated in the drawing, in a manner well known in the art, and that any one of many well known types of means may be employed for this purpose.

Referring now the drawings, a telephone system is shown in FIG. 1 thereof. A subscribers station indicated generally at 10 is connected to a calling station 20 via a central office 30 and appropriate telephone lines 12 and 22. Such connection on a ringing basis occurs when station 20 "calls" station 10 and office 30 "-finds" the line of station 10, as is well known in the art. A voice connection occurs between the stations, when during ringing connection, a proper resistance is imposed across the lines at station 10, a function normally performed by the lifting of the receiver (not shown). This voice connection is effected in the office 30 in response to the current drawn by the interposed resistance, as is also well known in the art.

The present invention utilizes a novel circuit including a ringing detector 40 and line answering means 70 to answer subscribers station 10 in a manner obviating all the deficiencies of the prior art bridging relay detector system. As shown in general in FIG. 1, detector 40 operates actuatable means, including a signal amplifier 50 which triggers actuating means 60, which actuates line answering means 70. Subscribers station 10 is thereupon connected to calling station 20 via central office 30.

Figure 2:
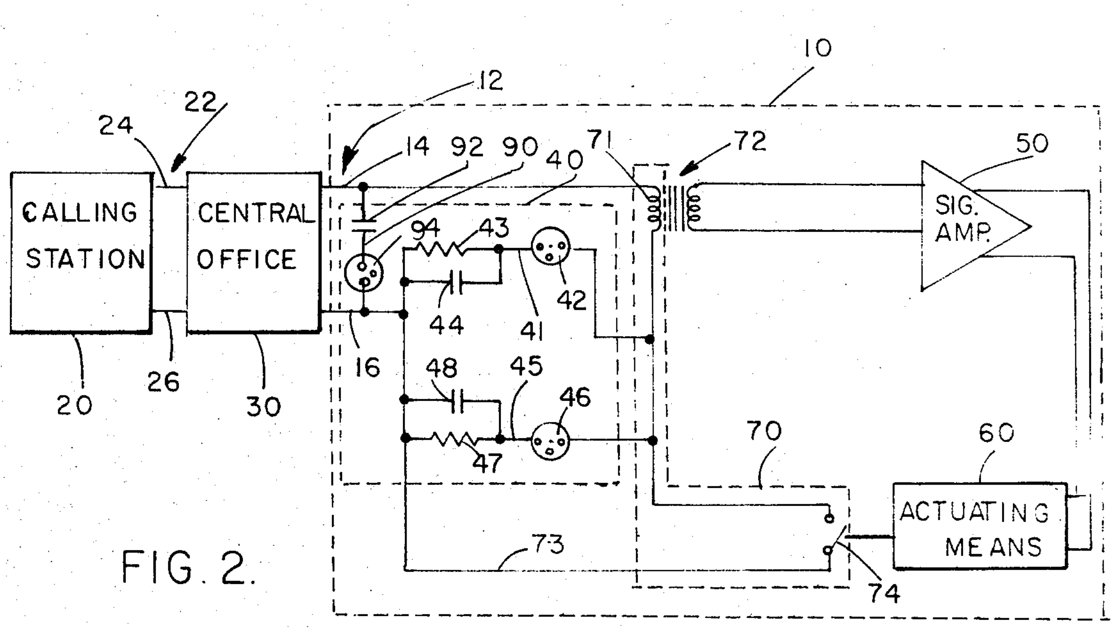
FIG. 2 is a partial block diagram of the system shown in FIG. 1 further showing the circuit of the present invention is partial schematic detail.

FIG. 2 shows in particularity one specific embodiment of the novel detecting and answering circuit of the present invention. Central office 30 is connected via lines 14 and 16 of telephone line 12 to equipment indicated generally at 10 as the subscribers station. More particularly, line 14 and line 16 are bridged within station 10 by primary 71 of a line coupling transformer indicated generally at 72. Connections between the line 12 and the primary 71 include parallel branches, one branch 73 including a switch 74, and two branches 41 and 45 each including a series-parallel arrangement wherein a lamp, 42 or 46 respectively, is connected in series with a resistor, 43 or 47 respectively, paralleled with a capacitor, 44 or 48 respectively. Each lamp 42, 46 is characteristically non-conductive or open circuited until a certain predetermined voltage is imposed thereon.

Members 41 through 48 define the ringing detector indicated generally at 40 and described below. Members 71, 73, and 74 define the line answering means indicated generally at 70. The D.C. resistance of primary 71 is chosen so that when the switch 74 is closed, sufficient current is drawn to cause the answering sequence in central office 30.

There are two distinct actions at work in the present circuit. The first involves the triggering of the lamps 42 and 46 only when a ringing signal is imposed thereon. The second invloves the utilization of this triggering to answer the line.

First as to the triggering of lamps 42, 46 only in response to a ringing signal, it is well known in the art that in many telephone systems a direct current bias is maintained on line 12 for purposes of dialling. Typically in such systems this bias is usually a D.C. source of minus 48 volts. In the circuit shown, the switch 74 is normally open, and the lamp 42, 46 are normally nonconducting, both because no ringing signal is on lines 14 and 16. Thus in systems employing such a D.C. bias, each lamp 42, 46 is chosen to have a firing point higher than the D.C. bias so that no firing will occur without a ringing signal on the lines. Specifically, when for example the aforesaid minus 48 volt D.C. bias systems are involved, a commercially available neon, glass bulb lamp firing at a somewhat higher voltage, as hereinafter described, will be employed.

The glass bulb lamps 42 and 46 are ionizable neon gas filled glow lamps having a very low impedance conducting state and a substantially infinite impedance non-conducting state. Each of the lamps has a pair of terminals of circuit connection. The lamps ionize and conduct in response to the application of a voltage across these terminals that is equal to or greater than a built-in breakdown voltage. In the preferred embodiment, lamps having a breakdown voltage of approximately 80 volts are advantageously employed in the circuit to act as switches to complete a low impedance conduction path. It is understood, of course, that lamps having breakdown voltage of other than 80 volts may be advantageously employed in other embodiments of the invention to provide switching means which operate at voltage levels other than the voltage hereinafter discussed.

Figure 3:
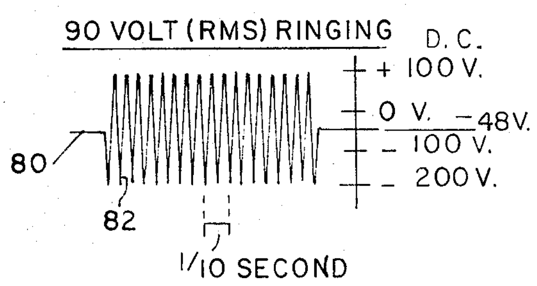
FIG. 3 is an illustration of a typical normal ringing signal waveform.
Figure 4:
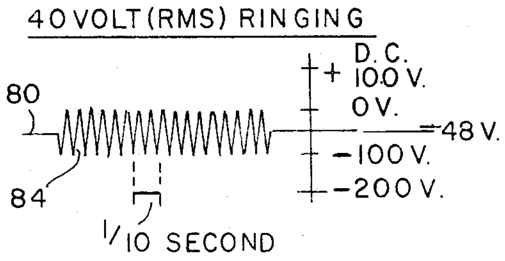
FIG. 4 is an illustration of a typical low level ringing waveform.

Thus when only the D.C. bias appears across lines 14 and 16, infinite impedance is presented by the open switch 74 and the non-conducting lamps 42, 46. However, when a ringing signal is superimposed across lines 14, 16 as aforesaid, triggering of at least one of the lamps 42, 46 is effected. The ringing signal is generally 20 cycle alternating current, and typically in such systems is either 90 volts A.C. as shown in FIG. 3 or 40 volts A.C. as shown in FIG. 4. FIGS. 3 and 4 reflect such biasing in that the ringing signal waveforms, normal ringing signal 82 of FIG. 3 and low level ringing signal 84 of FIG. 4, fluctuate with respect to a datum level 80 of minus 48 volts. Each of the signals 82, 84 includes positive and negative voltage excursions relative to the biasing voltage level on line 12.

The resistors 43 and 47 associated in series with lamps 42 and 46, respectively, determine the voltage range at which the lamps 42, 46 will fire. The resistor 43 is approximately 1 Meg ohms and causes the lamp 42 to fire or breakdown when a ringing signal of a range between 40 and 80 volts A.C. is on the line 12, wherein the lamp 42 will not fire below 40 volts A.C., and will just glow or illuminate without any fluctuation or oscillation above 80 volts A.C. The resistor 47 is approximately 3.3 Meg ohms and causes the lamp 46 to fire or breakdown when a ringing signal of a range between 70 and 160 volts A.C. is on the line 12, wherein the lamp 46 will not fire below 70 volts A.C., and will only glow without any oscillation above 160 volts.

The sum voltage of the 48 volt D.C. bias and the 40 volt A.C. ringing signal, as shown in FIG. 4 will exceed the firing point of the lamp 42, but not the firing point of the lamp 46 so that lamp 46 will not conduct. Every time the lamp 42 conducts, current passes through the primary 71. Since the resistance of the primary 71 has other resistance elements in the branch 41 is series with it, and since the switch 74 is not yet closed, the infinite impedance before firing is not lowered all the way to the impedance of the primary 71 yet. Clearly when the switch 74 is closed as described below, only the primary 71 is across the lines 14 and 16 and the current drawn answers the line.

The sum voltage of the 48 volt D.C. bias and the 90 volt A.C. ringing signal, as shown in FIG. 3, will exceed the firing point of both lamps 42 and 46, however, as stated above, the lamp 42 will only glow without any oscillations and therefore will not be effective to activate the primary 71 which functions only with an appropriate waveform current, as set forth hereinafter below. Every time the lamp 46 conducts, current passes through the primary 71. Since the resistance of the primary 71 has other resistance elements in the branch 45 in series with it, and since the switch 74 is not yet closed, the infinite impedance before firing is not lowered all the way to the impedance of the primary 71 yet. Clearly when the switch 74 is closed as described below, only the primary 71 is across the lines 14 and 16 and the current drawn answers the line.

It is noted, that when a ringing signal of approximately 70 to 80 volts A.C. is on the line 12, both lamps 42 and 46 will conduct, wherein a strong current will pass through the primary 71. However, the primary 71 will still function properly, as set forth hereinafter below, without any damage thereto.

It should be understood that although many telephone systems employ D.C. bias and A.C. ringing voltages as aforesaid, other systems employ only A.C. ringing voltages, or employ different values of one or both voltages. In all cases an appropriate resistor and neon lamp may be chosen so that it will be non-conductive when no ringing voltage is on the lines, and conductive when a ringing voltage is on the lines. In order to accomplish this, the predetermined firing voltage must in any case be greater than the D.C. bias if one is employed, and must be less than the voltage on the line when the ringing signal is impressed thereon. The voltage on the line when the ringing signal is impressed will be the effective total of that signal and the D.C. bias if one is employed.

When either lamp 42 or 46 fires, current is drawn through the primary 71 and the waveform thereof is impressed upon the input of the amplifier 50 via the line coupling transformer 72. Whether or not the capacitors 44 and 48 are employed in their respective circuits, depends upon the ringing signal waveform by the local telephone company, as explained below. Although all telephone service companies employ a low frequency A.C. ringing signal, and 20 cycles is nearly uniformly the value thereof, there are differences in harmonics. In some systems, harmonics in the hundreds of cycles are present, and in these the capacitors 44 and 48 may be omitted. In others, the signal is free of harmonics, that is, it is nearly a pure low frequency since wave, and in these systems the capacitors 44 and 48 are desirably employed. Preferably, the capacitors 44 and 48 each have a value of approximately 0.001 microfarad.

The reason for the above is that the amplifier 50 is primarily employed for recording and/or playback functions and it is uneconomical to expand its frequency response to 20 cycles, which is far below the telephone audio range. Thus where 300 cycle components are present in the waveform, the amplifier 50 which is normally responsive thereto will operate without the capacitors 44 and 48, although the presence of the capacitors will not detract therefrom. However, when no harmonics exist, the capacitors 44 and 48 act to cause their respective lamp 42, 46 to fire many times each cycle, thus in effect introducing higher frequencies into the waveform so that the amplifier 50 will respond thereto. Of course an amplifier responsive to 20 cycles may be employed in lieu of the capacitors 44 and 48; but such is uneconomical.

In any event, when either the lamp 42 or 46 fires, appropriate waveform current passes through the primary 71 so as to be responded to by the amplifier 50 which thereupon operates the actuating means 60, which may for example be a relay or relay coil. Means 60, in turn, closes the switch 74, which may be the contacts of the actuating means 60 if the actuating means is a relay coil, or may be a switch controlled by the actuating means 60 if the actuating means is a complete relay. The closing of the switch 74 provides a path through the branch 73 which includes only the impedance of the primary 71, which is of sufficiently low value to answer the station 10. The above operation causes the central office 30 to cease the ringing signal and to connect the audio circuit to the station 10, the central office 30 being connected to the calling station 20 by lines 24 and 26 of the telephone line 22.

When the audio circuit to the station 10 is connected as aforesaid, the station 10 is then ready to perform the recording and/or playback or other functions of an automatic telephone secretary. These functions are no part of the present invention which concerns the ringing detector and line answering circuit, but it should be noted that once the switch 74 is closed, the signal amplifier 50 is coupled by line transformer 72 to lines 14 and 16. By appropriate internal switching means (not shown), the amplifier 50 may then be employed to receive audio signals from the lines 14 and 16 and to impress local audio signals upon the lines. Thus after the station 10 is answered by the closing of the switch 74, the amplifier 50 has its input and output appropriately selectively switched to serve the recording and/or functions of a tape recorder or the like (not shown).

It will be appreciated that in its broad sense the circuit employs a resistance 71 which may be any resistor adapted to draw answering current across the lines 14 and 16. One lead in from the line 12 to the resistor 71 includes the above mentioned paralleled circuit, one branch of which has the normally open switch means 74, and the other branches of which each has one of the devices 42 and 46 which is an open circuit at voltages below the ringing voltage, but which conducts at voltages at or above the sum of the D.C. bias voltage (if any) with the ringing voltage, as set forth above. Commercially available neon lamps are merely one highly practical example of such devices that may be used with the present invention. Broadly defined, the line coupling transformer and means 50, 60 comprise actuatable means sensitive to the firing of either of the gas filled lamps 42 and 46, and adapted to thereupon close the switch 74 in response thereto, The D.C. resistance of the primary 71 will be chosen to confirm to what the local telephone company employs to answer the line by lifting the hand receiver or the like (not shown). Typically this will be approximately 100 ohms, and tolerances will allow about 90 to 135 ohm answering resistances to be employed without disturbing the rest of the central office equipment. Other values may be employed depending upon local requirements.

Telephone companies impose stringent restrictions upon equipment such as automatic telephone answering systems. For instance what is called "standby loss imposed by the ringing bridge," or the loss in ringing or audio signal attributable to the ringing detector, must be typically kept below 0.5 decibles. With the prior art bridging relay detectors this was impossible to attain with reasonable relay expense. With the present detecting circuit wherein the detector is in series with the lines 14 and 16 during ringing, that is when at least one of the lamps 42 and 46 is conducting, and furthermore wherein the detector is an open circuit during audio transmission, the standby loss as above defined is zero in both cases.

Relays are not inherently sensitive devices. It is very expensive to upgrade them for the detector purpose herein described, but even when upgraded, the highest practically attainable sensitivity is in the range of from 2 to 10 ma. The present detector has a sensitivity of 0.1 ma. Also of course, the components of the present circuit are very economical compared to relays in general, and particularly compared to specially upgraded relays.

Furthermore relays are often falsely triggered by local pulsing, as for example when the D.C. bias is interrupted to form the dialling encoding. The present circuit is free from such defect, as will be set forth hereinafter below.

Figure 5:
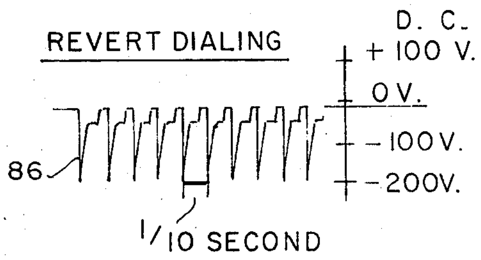
FIG. 5 is an illustration of a typical un-desirable signal.

FIG. 5 shows a typical revert dialling waveform 86. Revert dialling waveforms are impressed on incoming telephone lines when the local subscriber dials the central office for connection to a remote subscriber. It is seen that in accordance with the above, revert dialling may cause the lamps 42 and 46 to breakdown or fire since the pulses comprising the waveform negatively peak at less than minus 80 volts, wherein these pulses are equivalent to the sum voltage of the 48 volt D.C. bias and either of the 40 or 90 volt A.C. ringing signal which causes the lamps 42 and 46 to conduct.

As seen in FIG. 2, a branch 90 is connected between the line 12 and the primary 71, thereby bridging the lines 14 and 16 in parallel arrangement with the primary 71 in series respectively with the branches 41, 45 and 73. The branch 90 includes a capacitor 92, preferably having a low value of 0.05 microfarad. The capacitor 92 will short circuit the revert dialling signals present on the telephone line 12 so that the primary 71 is not activated by these signals.

However, the capacitor 92 will not short circuit the ringing signals because the value of the capacitor 92 is predetermined to be low enough to effect the revert dialling signals and not the ringing signals, so that as shown above, there is no false triggering of the branches 41 and 45 by the revert dialling signals.

The branch 90 also includes a neon lamp 94 in series with the capacitor 92. The lamp 94 is similar to and has the same breakdown voltage as the lamps 42 and 46. The lamp 94 is triggered by the revert dialling signals so that these revert dialling signals are short circuited as set forth above, however, the lamp 94 will not be triggered by the lower audio signals. Therefore, when the audio circuit is connected to the station 10 as stated above, the branch will be open because the lamp 94 will not fire, whereby the branch 90 will not short circuit the lines 14 and 16 of the telephone line during audio signals.

It will be apparent to those skilled in the art that the present circuit exceeds all that the art has sought in a detector and line answerer for telephone circuits. It advances over the prior art in both economy and performance.

Numerous alterations of the structure herein disclosed will suggest themselves to those skilled in the art. However, it is to be understood that the present disclosure relates to a preferred embodiment of the invention which is for purposes of illustration only and not to be construed as a limitation of the invention.

What is claimed is:

1. A telephone ringing signal detector and line answering means for use with incoming telephone lines comprising line bridging means having D.C. resistance connected across said lines, a parallel circuit in one of said incoming lines before said bridging means, a first branch of said parallel circuit including switch means, a second branch of said parallel circuit including first voltage sensitive means to present an open circuit below a first predetermined applied voltage and to conduct at voltages higher than said first predetermined voltage, a third branch of said parallel circuit includes second voltage sensitive means to present an open circuit below a second predetermined applied voltage and to conduct at voltages higher than said second predetermined voltage, said second predetermined voltage being higher than said first predetermined voltage, and actuating means coacting with said D.C. resistance to be responsive to conducting of either one of said first and second voltage sensitive means to close said switch means.

2. A telephone ringing signal detector and line answering means according to claim 1, wherein at least one of said first and second voltage sensitive means includes a gas filled lamp.

3. A telephone ringing signal detector and line answering means according to claim 2, wherein said lamp is neon filled.

4. A telephone ringing signal detector and line answering means according to claim 2, wherein said at least one voltage sensitive means further includes a resistor in series with said lamp.

5. A telephone ringing signal detector and line answering means according to claim 4, wherein said at least one voltage sensitive means still further includes a capacitor in parallel with said resistor.

6. A telephone ringing signal detector and line answering means according to claim 5 further comprising actuatable means, said actuatable means including line coupling means with said D.C. resistance defining a primary winding thereof, signal amplifier means connected to secondary of said coupling means, and said actuating means connected to said amplifier means for controlling said switch means.

7. A telephone ringing signal detector and line answering means according to claim 1 further comprising actuatable means, said actuatable means including line coupling means with said D.C. resistance defining a primary winding thereof.

8. A telephone ringing signal detector and line answering means according to claim 7, wherein said actuatable means further includes signal amplifier means connected to secondary of said coupling means, and said actuating means connected to said amplifier means for controlling said switch means.

9. A telephone ringing signal detector and line answering means according to claim 8, wherein said actuating means includes relay means.

10. A telephone ringing signal detector and line answering means according to claim 8, wherein at least one of said second and third branches of said parallel circuit includes a capacitor.

11. A telephone ringing signal detector and line answering means according to claim 1, wherein each of said first and second voltage sensitive means includes a resistor, said third branch resistor being of higher value than said second branch resistor.

12. A telephone ringing signal detector and line answering means according to claim 11, wherein each of said first and second sensitive means further includes a gas filled lamp in series with said respective branch resistor.

13. A telephone ringing signal detector and line answering means according to claim 12, wherein each of said voltage sensitive means still further includes a capacitor in parallel with said respective branch resistor.

14. A telephone ringing signal detector and line answering means according to claim 13, wherein short circuit means are connected across said telephone lines in a parallel arrangement with a series circuit defined by said bridging means and said parallel circuit, said short circuit means preventing signals other than ringing signals from causing said conducting of either one of said first and second voltage sensitive means.

15. A telephone ringing signal detector and line answering means for use with incoming telephone lines comprising line bridging means having D.C. resistance connected across said lines, a parallel circuit in one of said incoming lines before said bridging means, a first branch of said parallel circuit including switch means, a second branch of said parallel circuit including voltage sensitive means to present an open circuit below a certain predetermined applied voltage and to conduct at voltages higher than said predetermined voltage, actuating means coacting with said D.C. resistance to be responsive to conducting of said voltage sensitive means to close said switch means, and short circuit means connected across said telephone lines in a parallel arrangement with a series circuit defined by said bridging means and said parallel circuit, said short circuit means preventing signals other than ringing signals from causing said conducting of said voltage sensitive means.

16. A telephone ringing signal detector and line answering means according to claim 15, wherein said short circuit means includes a capacitor.

17. A telephone ringing signal detector and line answering means according to claim 16, wherein said short circuit means further includes a voltage sensitive means in series with said capacitor to present an open circuit below a certain predetermined applied voltage and to conduct at voltages higher than said latter predetermined voltage.

18. A telephone ringing signal detector and line answering means according to claim 17, wherein said voltage sensitive means of said short circuit means includes a gas filled lamp.

19. A telephone ringing signal detector and line answering means according to claim 15, wherein a third branch of said parallel circuit also includes voltage sensitive means to present an open circuit below a certain predetermined applied voltage and to conduct at voltages higher than said latter predetermined voltage, said latter predetermined voltage being higher than said first-mentioned predetermined voltage.

* * * * *